United States Patent [19]

Irwin et al.

[11] 3,986,858
[45] Oct. 19, 1976

[54] BAFFLE ARM OPERATING MECHANISM

[75] Inventors: George W. Irwin, Holland, Ohio; Eustace H. Mumford, Ottawa Lake, Mich.

[73] Assignee: Owens-Illinois, Inc., Toledo, Ohio

[22] Filed: Sept. 3, 1974

[21] Appl. No.: 502,327

[52] U.S. Cl. .................................. 65/234; 65/229; 65/233; 65/300; 65/359; 92/31; 92/136
[51] Int. Cl.[2] ...................... C03B 5/38; C03B 9/00; F01B 19/00
[58] Field of Search ............ 65/234, 229, 233, 359, 65/300; 92/31, 136

[56] References Cited
UNITED STATES PATENTS

| | | | |
|---|---|---|---|
| 344,222 | 6/1886 | Thomas | 92/136 X |
| 1,602,209 | 10/1926 | Proell | 92/136 X |
| 2,307,564 | 1/1943 | Bridges | 65/233 |
| 2,466,669 | 4/1949 | Winder | 65/233 X |
| 3,165,982 | 1/1965 | Taylor | 92/136 X |
| 3,183,792 | 5/1965 | Allen | 92/136 X |
| 3,383,193 | 5/1968 | Bailey | 65/234 |
| 3,732,088 | 5/1973 | Zappia | 65/300 |

*Primary Examiner*—S. Leon Bashore
*Assistant Examiner*—Frank W. Miga
*Attorney, Agent, or Firm*—D. T. Innis; E. J. Holler

[57] ABSTRACT

In apparatus for molding glass into hollow-shaped articles such as glass containers, glass is delivered to a parison mold wherein the glass is shaped either by a plunger or by a counter-blow with the end of the parison mold, through which the glass is delivered, closed by what is termed a "baffle." The mechanism for moving the baffle on a conventional IS machine must be capable of moving the baffle from an upper, radially displaced position, to a lower aligned position over the mold. The operation of the baffle seating motion is accomplished by the use of a vertically reciprocable, fluid-operated motor in which a baffle arm carrying piston rod of the motor is turned about its axis during its upward and downward movement. The control of the fluid supply to the motor and the exhaust from the motor is such that the rate of movement is monitored and controlled. The piston rod effectively extends through the piston with the lower end of the rod being provided with a cam follower and with the lower cylinder head, in effect, being the cam which in cooperation with the cam follower effects the turning of the piston rod in response to the vertical movement of the piston and rod. The cam follower is of a design such that it is less subject to damage through continuous use and the lower cylinder head is such that no seal is necessary between the piston and the lower rod section that carries the follower.

3 Claims, 6 Drawing Figures

BAFFLE ARM OPERATING MECHANISM

BACKGROUND OF THE INVENTION

In the operation of the conventional parison molding portion of an IS machine, baffle mechanism, such as that shown in Mumford, U.S. Pat. No. 3,586,494 issued June 22, 1971, requires the operation of a motor with a piston rod-guiding arrangement so that the piston rod will be rotatably oscillated about its vertical axis in a repetitive cycle which may occur as frequently as twenty times a minute. Thus, the design of the mechanism and the motor which moves the baffle arm up and down and turns the arm so that the baffles are moved into and out of mold-closing position must be of a rugged character capable of operation over long periods of time without significant break-downs.

SUMMARY OF THE INVENTION

An improved baffle operating mechanism for a glass forming machine, in which the drive motor for the baffle arm, supporting rod is guided by a cam which is actually part of the lower cylinder head for the vertically reciprocable piston of the motor. In this manner, no seals are needed between the piston and the lower cam follower on the piston rod.

DETAILED DESCRIPTION OF THE DRAWINGS

Figure 1:
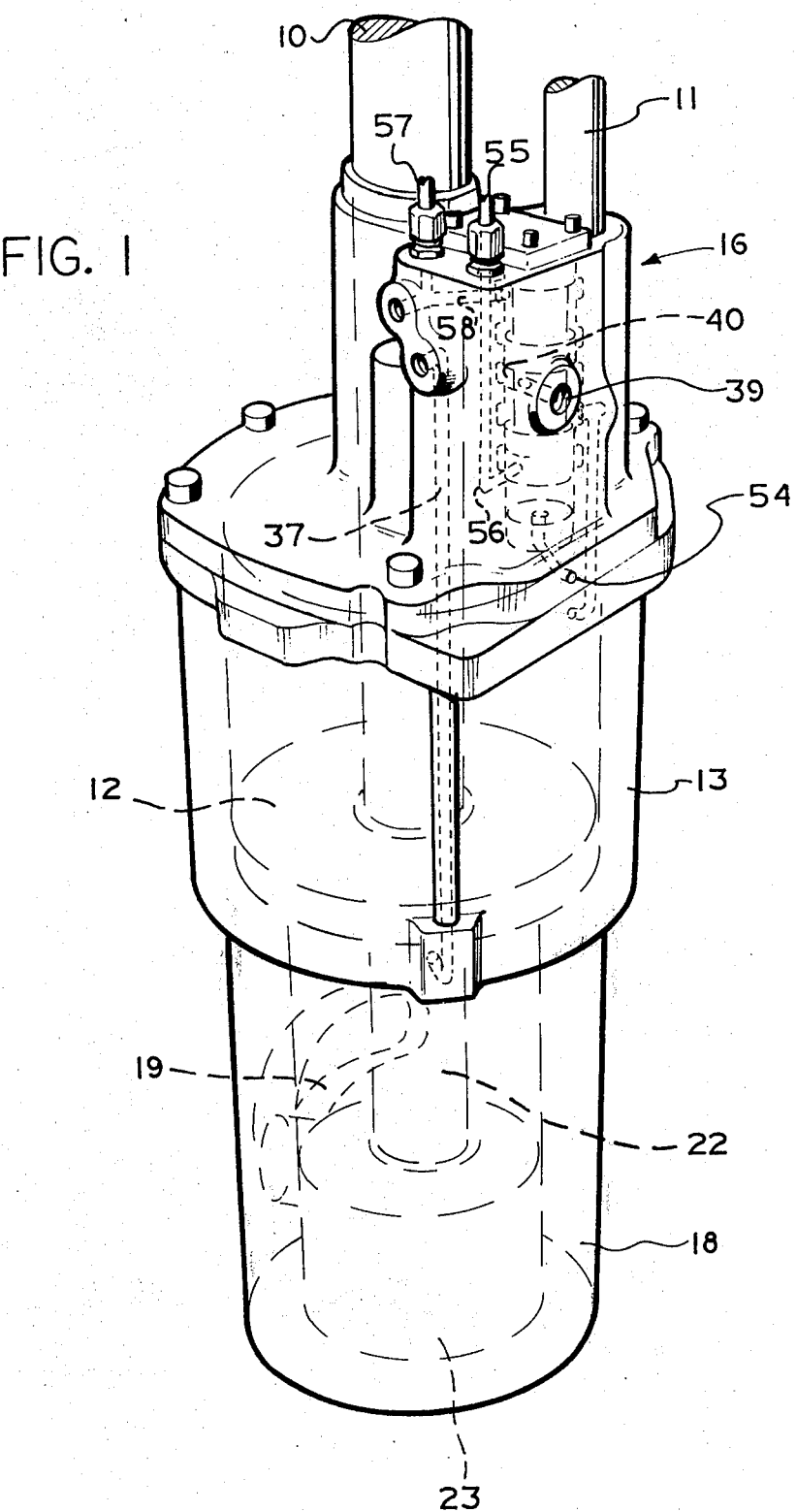
FIG. 1 is a schematic perspective view of the apparatus of the invention.
Figure 2:
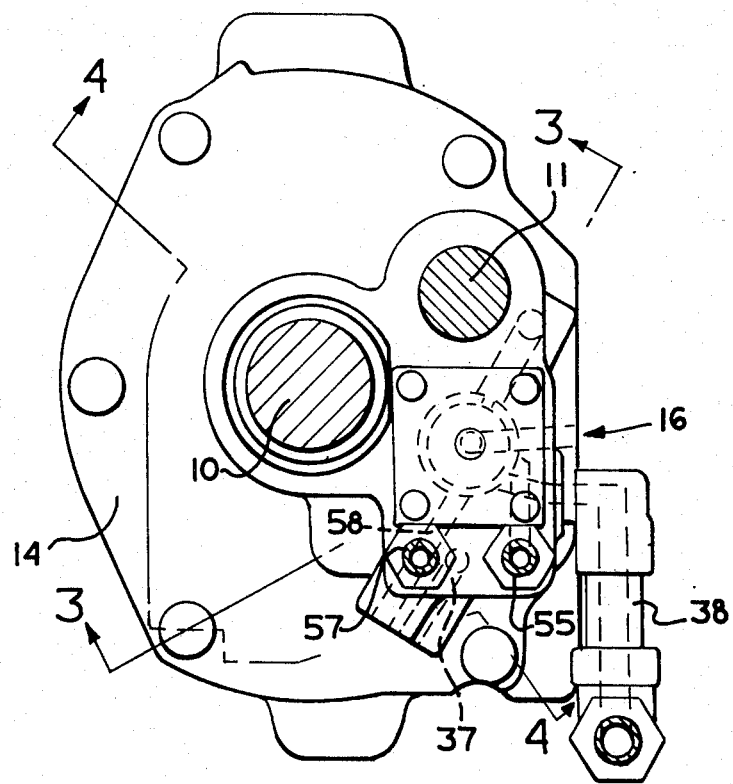
FIG. 2 is a top plan view of the mechanism of FIG. 1.

With particular reference to FIG. 1 and the above-referred-to Mumford, U.S. Pat. No. 3,586,494, the detailed description of the apparatus of the invention will be given. It should be understood that the apparatus of the invention is essentially a fluid-operated reciprocating motor whose output piston rod 10 is a baffle arm-carrying member. As previously stated, the particular mechanism herein disclosed is specifically utilized with the pantographic style of the baffle arm disclosed in U.S. Pat. No. 3,586,494, with the fixed shaft 11 corresponding to the same shaft shown in FIG. 2 of the Mumford patent at 29. The piston rod 10 is connected to a piston 12 which is slideable within a cylinder member 13. The upper end of the cylinder 13 is closed by a cylinder head 14. Above the head 14, and connected thereto, is the lower flange portion 15 of a control valve and porting member, generally designated 16. The cylinder member 13 is provided with an internal ledge 17 which, in effect, defines the lowermost position of the piston 12. To the lower end of the cylinder member 13 is connected a combined cam housing and lower cylinder head 18. The housing 18 is formed with a cam slot 19 which extends through the wall of the housing. The cam slot is covered by a curved plate 20 which is held in place by a plurality of bolts 21 which clamp the plate to the housing 18 and seal off the generally vertically extending opening formed by the cam slot 19. The piston 12 has a lower or downwardly extending rod section 22. This rod section 22 is formed with an enlarged head portion 23 at the lower end. The head portion 23 has an external circumference which is embraced by the inside of the housing 18, so that vertical movement of the piston rod and the head portion 23 are carefully guided by the internal surface of the cam housing 18. The head 23 is formed with a diametrically extending, substantially horizontal, tapered opening 24 within which a tapered stud 25 is seated. The tapered or frusto-conical stud is held within the complementary opening 24 in the head 23 by a threaded bolt 26. The radially extending portion of the stud 25 rotatably supports two cam follower rollers 27 and 28. The rollers 27 and 28 are retained on the stud 25 by a retaining clip 29 positioned within the forward recess of roller 28.

Figure 4:
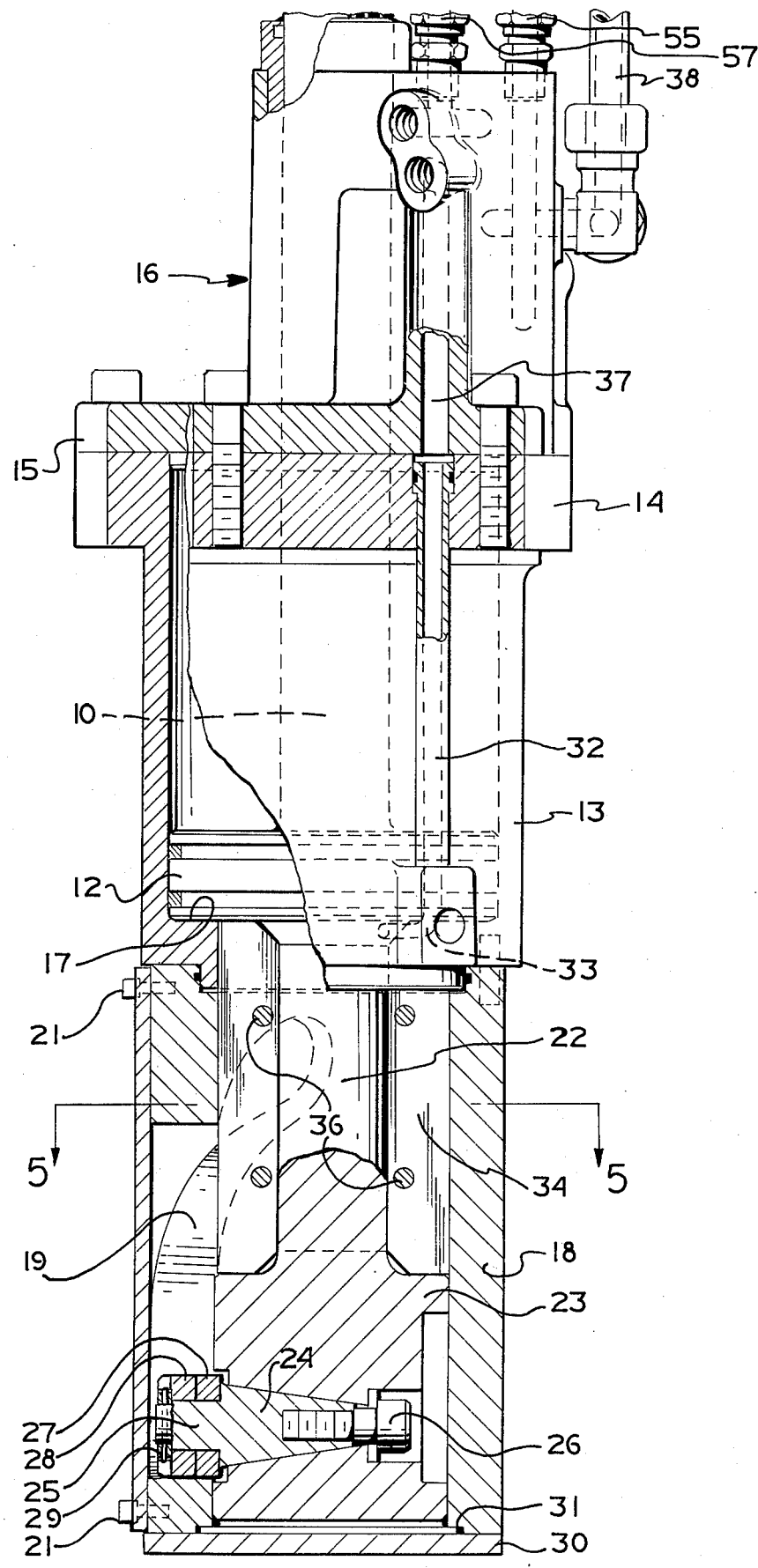
FIG. 4 is a partial cross-sectional view taken at line 4—4 of FIG. 2.

As can be seen when viewing FIG. 4, the bottom of cylinder 18 is closed by a plate 30 with a sealing gasket 31, assuring that fluid pressure introduced to the interior of the housing 18 will not leak out.

Because the cam follower rollers 27 and 28 are required to move through different distances because of the difference in radial positioning of these members relative to the slot 19, splitting the follower into two rollers provides less frictional drag of any portion of the cam follower as a whole during the movement of the cam follower within the confines of the cam track. In those situations where the cam followers were made of a single piece, it was found that excessive wear would occur over a period of time, either in the cam slot or in the follower roller due to the slightly greater distance the outer portion of the follower travels relative to the inner portion of the follower. By having the cam follower made of two roller members, which are independently mounted on the stud, less wear and less drag are experienced in the system when the piston is moved upwardly and the piston rod is turned by the cam follower. Furthermore, the large radius of the head 23 aids in the guiding of the piston rod 10 without substantial vibration. The introduction of air under pressure to the cylinder 13 below the piston 12 is through a pipe connection 32 whose upper end is seated within the upper head 14 and whose lower end communicates with a radial passage 33 extending through the wall of the cylinder member 13 in the general location of the ledge 17. The air introduced at this point will be confined within the lower cylinder head 18 and the pressure created therein will cause the piston 12 to rise. In order to avoid the necessity of using a large supply of air to always fill the area of the unoccupied portion of the lower cylinder head 18, a pair of semi-cylindrical sleeves 34 and 35 are used in surrounding relationship to the lower rod section 22 and are retained in position by connectors 36. Fluid pressure is cycled to the pipe connection 32 at its upper end through a passage 37 formed in the control valve porting member 16.

Figure 3:
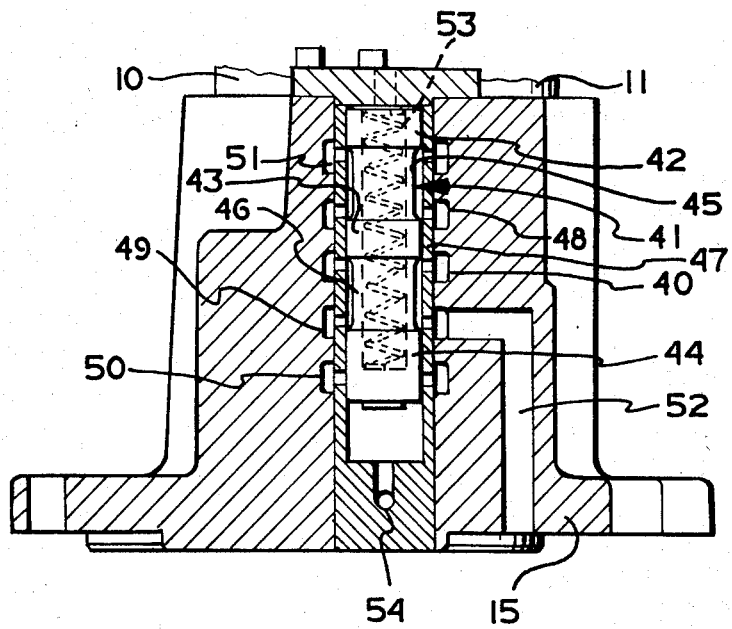
FIG. 3 is a cross-sectional view taken at line 3—3 of FIG. 2.
Figure 6:
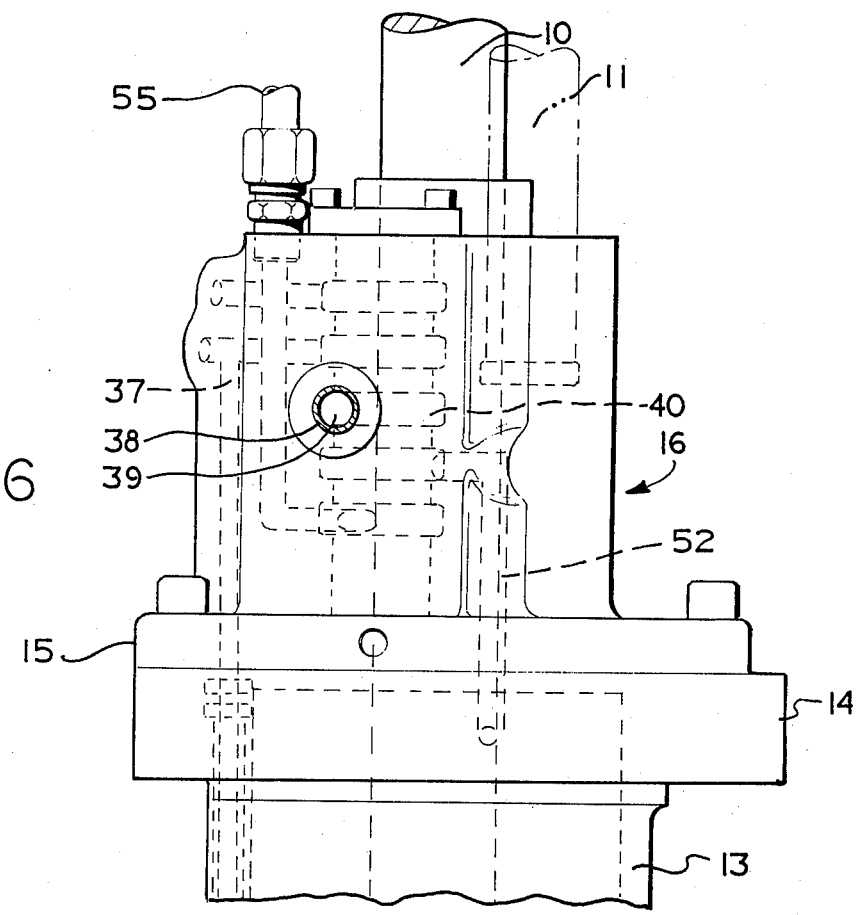
FIG. 6 is a side elevational view of the upper portion of the apparatus of FIG. 1, on a somewhat large scale.
Figure 5:
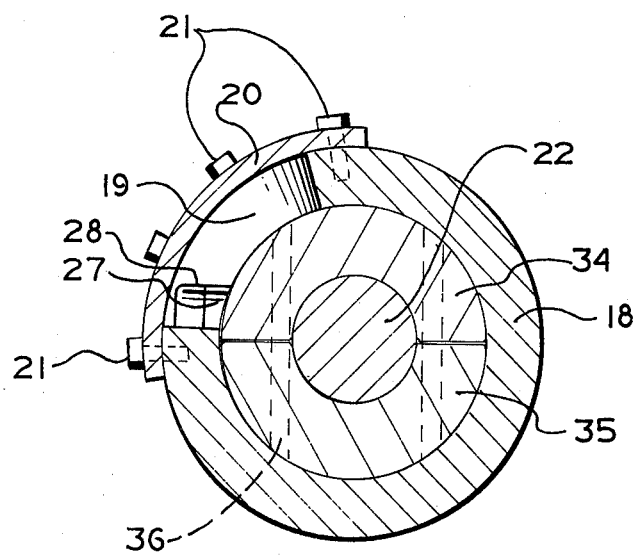
FIG. 5 is a cross-sectional view taken at line 5—5 of FIG. 4.

The source of air under pressure for operating the motor is supplied to the upper control valve member through a pipe 38. As best shown in FIG. 6, the pipe 38 is connected to the housing 16 and communicates with a passage 39 which extends inwardly and terminates at its inward end in annular cut-out portion 40. A spool valve 41 having spaced lands 42-44 and grooves 45 and 46 is positioned within a sleeve 47. Sleeve 47 has a plurality of radially extending openings which communicate with the annular cut-out portion or chamber 40 and similar chambers 48, 49, 50, 51 formed at spaced intervals within the vertical passage in the control valve member 16 within which the sleeve 47 is positioned. Specifically, the chamber 48 is connected to the passage 37 which, as previously described, provides a connection to the underneath area of the piston 12. The chamber 49 is connected to a passage 52 that extends downwardly and opens into the interior of the cylinder 13 just below the head 14. The two chambers 50 and 51 are exhaust chambers respectively for chambers formed for the upper and lower sides of piston 12. The valve spool 41 is spring-biased in the downward direction by a spring 53. In the position shown in FIG. 3, the spool 41 is shown in its elevated position with the spring 53 compressed. This is the position of the spool where the chamber 40 is in communication with the chamber 49 and the source of air under pressure is, therefore, operating on the top of the piston 12 to move it to the position shown in FIG. 4. The spool 41 is held in its upward position by fluid under pressure introduced through a passage 54 from a timing control valve (not shown). An exhaust pipe 55 extending upwardly from the top of the control valve housing 16, is connected by a passage 56 to the exhaust chamber 50 and a pipe 57 is connected by a passage 58 to the exhaust chamber 51. With the spool 41 in its position shown in FIG. 3, the air that is trapped beneath the piston 12 will have been exhausted upwardly through the pipe connection 32 through the passage 37 to the chamber 48 and in turn passes through the sleeve 47 to the groove 45 into the exhaust chamber 51 and thence out through the pipe 57. Suitable throttling (not shown) are provided in the exhaust line 57 to control the rate of downward movement of the piston 12 and in turn control the speed with which the baffles are seated on the parison molds. In a like manner, shift of the spool to its downward position by the spring 53 upon the release of pressure through passage 54, will result in air being exhausted in a controlled manner through the pipe 55.

Thus, it can be seen that with the above-described mechanism, reciprocation and rotation of the piston rod 10 is accomplished with a motor mechanism most suited to its purpose with the cam follower being formed of two roller members to provide a better drive system with regard to the cam and avoids drag during the reciprocation of the piston rod. Furthermore, the lower cylinder head encloses the cam and cam follower mechanism, thus obviating the requirement of a seal about the lower shaft portion 22 and in this way reduces the frictional drag on the motor. Also, elimination of the seal results in a mechanism which is less subject to wear and leakage.

We claim:

1. In apparatus for forming glass articles in which a parison mold is supplied with a charge of glass and the open end of the parison mold is closed by a baffle before forming of the parison and the formed parison is then transferred to a blow mold where the article is formed into final shape, the improvement in the baffle operating mechanism comprising:
    a cylinder;
    a piston within said cylinder;
    a piston rod connected to said piston;
    a first cylinder head closing one end of said cylinder and through which one end of said piston rod extends;
    a second cylinder head closing the other end of said cylinder, said second cylinder head comprising an elongated, closed end, cylindrical housing having an internal guide surface, an enlarged guide head connected to the other end of said piston rod, said guide head being positioned within said cylindrical housing and guided by the internal guide surface of said second cylinder head.

2. The apparatus of claim 1, wherein said second cylinder head is formed with an elongated, vertically extending slot in the wall thereof terminating in a circumferentially extending portion at the upper end thereof, follower means extending radially from said guide head into said slot, and means external to said member for sealing said slot.

3. The apparatus of claim 2, wherein said follower means comprises a radial shaft and a pair of identical rollers positioned on said shaft within said slot, each said rollers being mounted for independent rotation relative to said slot and said shaft.

* * * * *